Sept. 12, 1944.   H. EINLOTH   2,357,814
MACHINE FOR MAKING FIBER CONTAINERS
Filed May 3, 1943   3 Sheets-Sheet 3

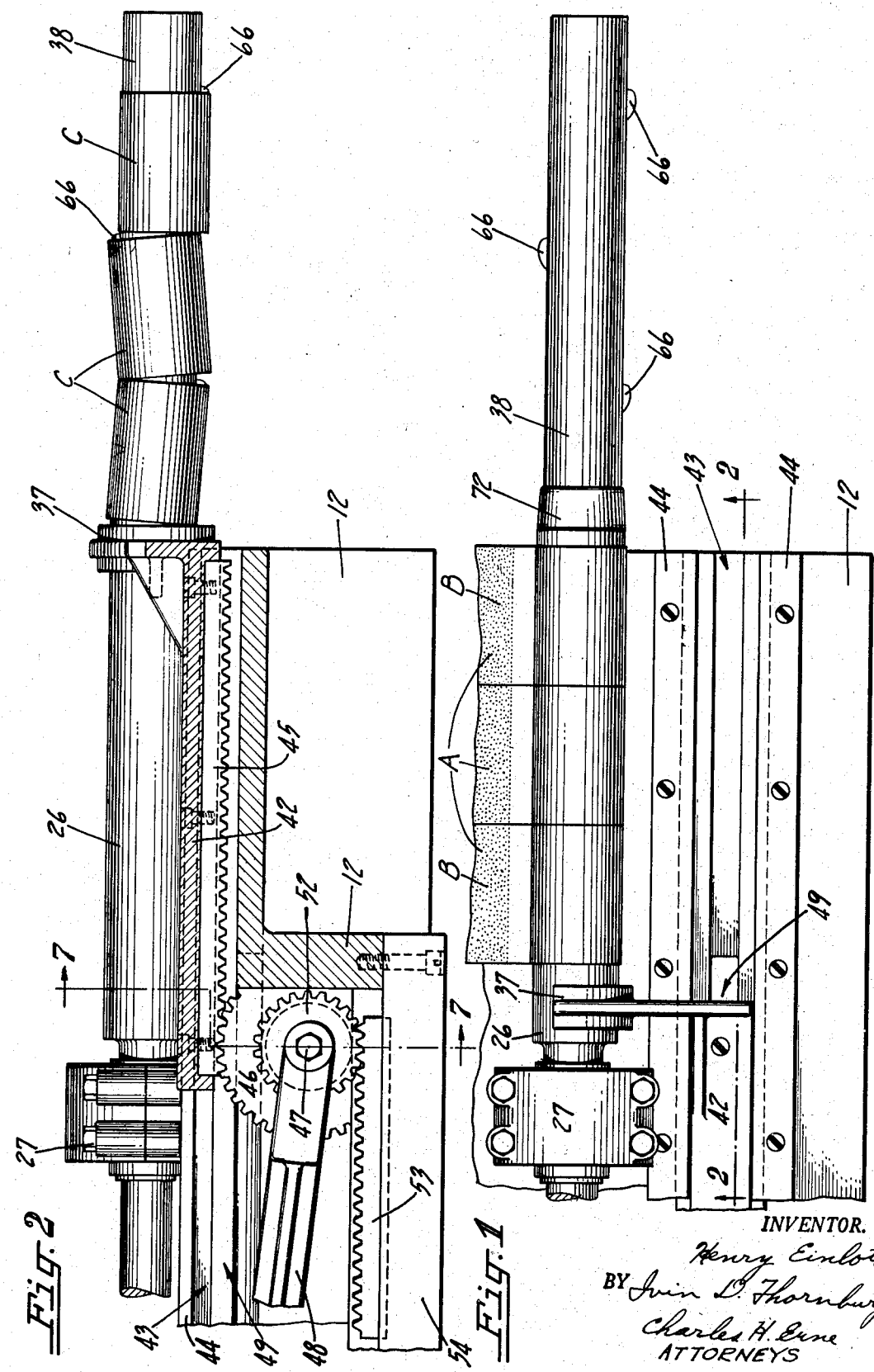

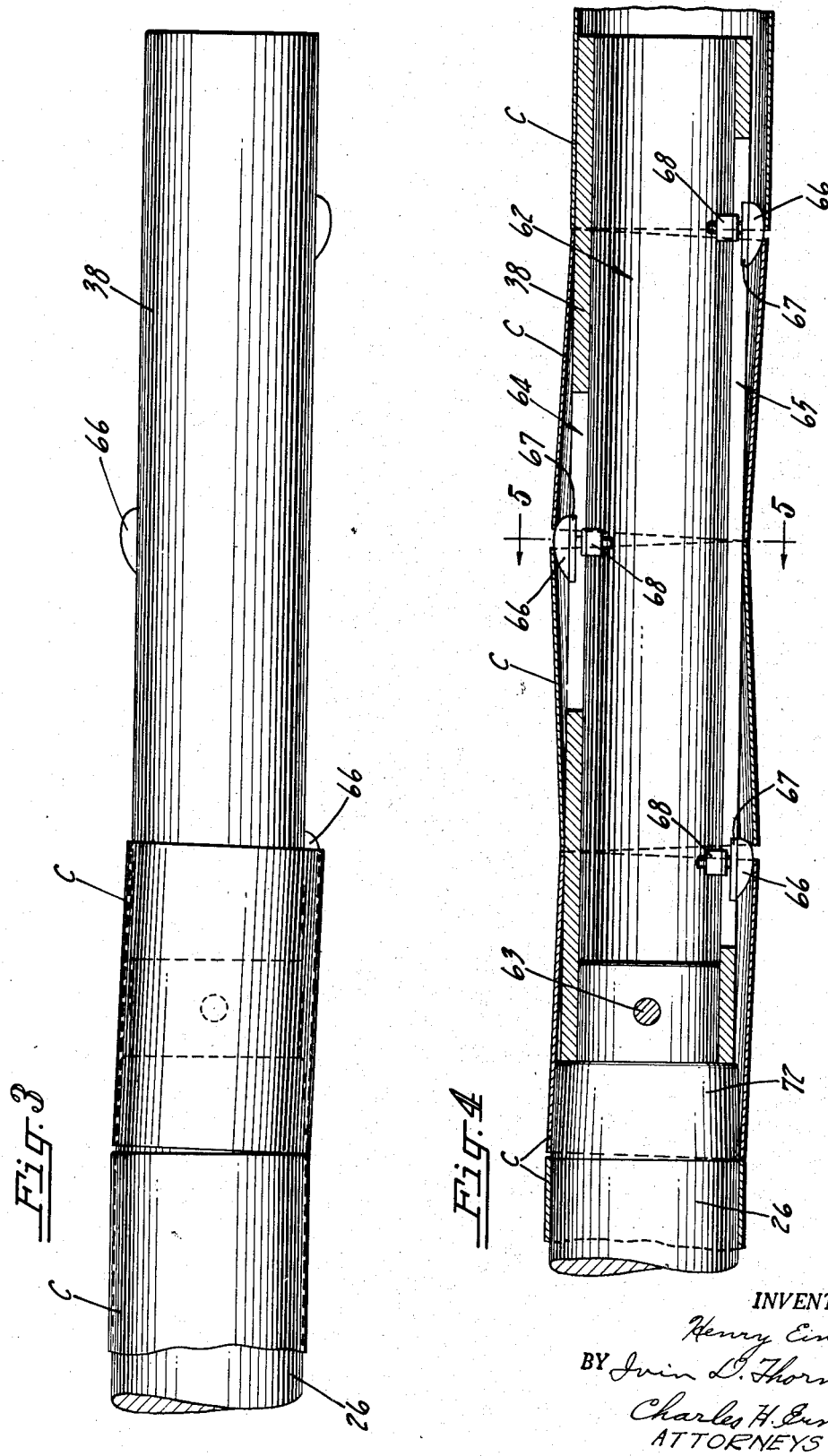

INVENTOR.
Henry Einloth
BY Ivin D. Thornburgh
Charles H. Ene
ATTORNEYS

Patented Sept. 12, 1944

2,357,814

UNITED STATES PATENT OFFICE 2,357,814

MACHINE FOR MAKING FIBER CONTAINERS

Henry Einloth, Irvington, N. J., assignor to American Can Company, New York, N. Y., a corporation of New Jersey Application May 3, 1943, Serial No. 485,516

3 Claims. (Cl. 93—81)

This invention relates to a machine for winding simultaneously a plurality of contiguous fiber container bodies and has particular reference to shifting the wound bodies laterally while stripping them endwise from their body forming mandrel for separating successive container bodies.

The present invention contemplates a high speed laminated winding machine for producing simultaneously a plurality of contiguous fiber container bodies each consisting of multiple layers with an adhesive therebetween, the bodies preferably being formed from a continuous web of fibrous stock that has been coated with an adhesive and that has been slit and cut to provide a plurality of juxtaposed blanks which are wound to cylindrical form or other desired cross section in contiguous relation on a body forming mandrel. These wound bodies thereafter are stripped from the mandrel onto and along a mandrel extension and while the bodies are being stripped they also are being shifted from side to side to break any endwise sticking together of the bodies. Such sticking conditions may be due to overlapping of adjacent or contiguous edges or may be due to end extrusion of adhesive during the winding operation.

An object of the invention is the provision of a convolute or laminated tubular body winding machine for producing simultaneously a plurality of contiguous fiber container bodies wherein successive wound bodies are stripped endwise from the body forming mandrel while being shifted laterally to break apart any end-to-end sticking of the adjoining bodies.

Another object of the invention is the provision of a machine for producing such container bodies wherein a pluralty of projections are located in spaced relation on opposite sides of a mandrel extension so that when a plurality of wound contiguous fiber container bodies are stripped endwise from the container body forming mandrel they are slid onto and over the projections and simultaneously are shifted from side to side in opposite directions to separate individual container bodies.

Numerous other objects and advantages of the invention will be apparent as it is better understood from the following description, which, taken in connection with the accompanying drawings, discloses a preferred embodiment thereof.

Referring to the drawings:

Figure 1 is a plan view of a tubular body winding machine embodying the present invention, parts being broken away;

Fig. 2 is a longitudinal elevation and sectional view taken substantially along the line 2—2 in Fig. 1, parts being broken away;

Fig. 3 is an enlarged view showing a body forming mandrel and mandrel extension with projections shown on opposite sides of the extension;

Fig. 4 is a longitudinal section drawn through the mandrel extension shown in Fig. 3 and showing container bodies shifted in opposite directions therealong;

As a preferred embodiment of the instant invention the drawings illustrate the principal parts of a machine for winding laminated container bodies of cylindrical shape or of other cross section. The containers preferably are formed from prepared blanks fed from a continuous web of fibrous material that has been unreeled from a supply roll and has been coated with an adhesive, in any suitable manner. The coated stock web then is slit longitudinally into a plurality of body height strips which thereafter are cut transversely in desired body blank lengths to provide multiple blanks of material for winding of the bodies.

A plurality of such body blanks then are advanced simultaneously toward a body forming mandrel in contiguous relationship for winding into tubular body shape. Following this winding the container bodies are stripped endwise from the mandrel onto and over a mandrel extension and during such advancement the bodies are shifted laterally of the mandrel extension, first in one and then in the opposite direction in order to break apart adjacent container bodies.

In the instant machine, a substantially continuous web A (Fig. 7) of fiber body stock, coated at intervals along its upper surface with a suitable adhesive B, is fed along a straight path of travel over a table 11 carried on a main frame 12. The coated portions of the web will be wound between layers of material when the web is formed subsequently into can body shape to unite the layers as is well known in fiber can manufacture.

Figure 7:
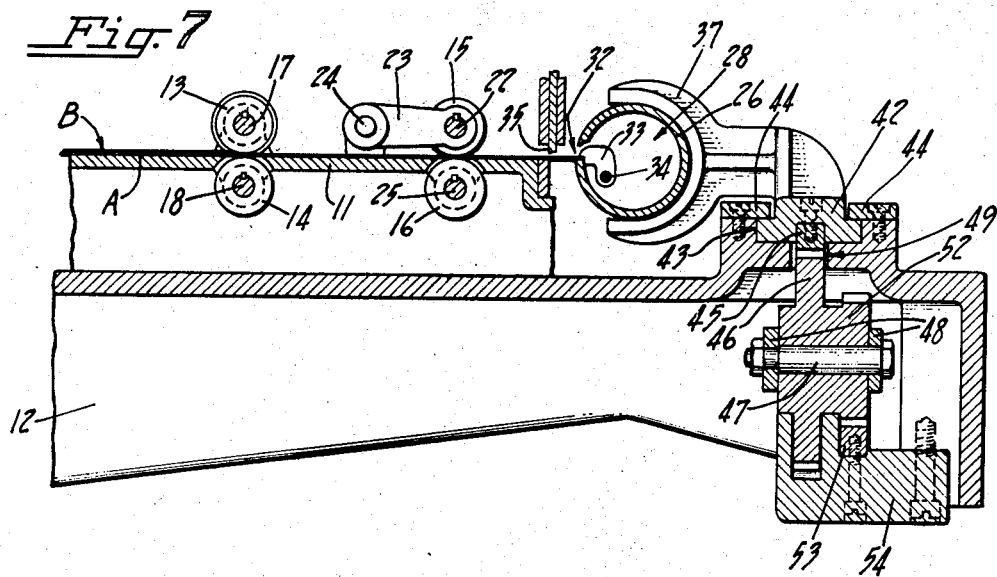
Fig. 7 is a transverse sectional view taken substantially along the broken lines 7—7 in Fig. 2 with other parts added.

The web of material A is fed at times along the table 11 through cooperating slitting and anvil rolls 13, 14 by means of a feed unit comprising rolls 15, 16 (Fig. 7). The rolls 13, 14 slit the web material lengthwise while it passes between each pair of rolls, the rolls of each pair being carried on shafts 17, 18 journaled in bearings in the main frame. There are two pairs of such rolls in the instant machine (Fig. 1) for cutting three strips the width of each being of single body height.

The rolls 15 of the feed unit are idler rolls and are mounted on a shaft 22 in crank levers 23. Each lever is carried on a shaft 24 mounted in the machine main frame. These idler rolls intermittently cooperate with the corresponding feed rolls 16 for a feeding action. Rolls 16 are carried on a shaft 25 mounted in the machine frame. Shafts 17, 18 and 25 are driven in timed relation in a convenient manner so as to cooperate with other moving parts of the machine.

The levers 23 are actuated in any suitable manner to raise the idler rolls 15 out of engagement with the coated portions of the slit web material A. This is done to avoid getting the adhesive coated portions onto the rolls and at such time the feed unit is not functioning. Levers 23 also are actuated to lower the idler rolls 15 into cooperating position with their corresponding feed rolls 16 for feeding the slit strips only when uncoated portions thereof are passing as will be explained at this time.

The leading uncoated end portions of a plurality of contiguous strips or slit web sections are advanced by the feeding rolls toward a forming mandrel 26 journaled in bearings 27 in the main frame (Figs. 1 and 2). This mandrel preferably has a hollow section as at 28 with a strip opening 32 (Fig. 7). The leading edges of the web strips enter into the opening 32 this being a conventional winding step. The mandrel is at rest at such a time. The inserted ends of the strip are clamped to the mandrel by a pivotally mounted clamping jaw element 33 carried on a pivot pin 34. After such insertion the clamping jaw moves down against the forward ends and clamps them tightly against the edge of the mandrel opening preparatory to winding.

The clamping or gripping of the ends of the web material is followed by rotation of the mandrel. As the mandrel rotates, the plurality of contiguous slit web strips simultaneously wraps around the mandrel, being wound into a plurality of laminated container bodies which are juxtaposed and in end-to-end relation with each other.

Just prior to completing the last turn of the mandrel for the desired number of multiple layers, each slit web strip is cut transversely by a cut-off knife 35. This knife moves down against a cooperating blade 36 thus separating the wound bodies from the web material A.

The remaining unwound ends of the blanks then are wound on the mandrel after which the jaw 33 releases its hold on the forward ends and the completed bodies thereafter are ready for removal from the mandrel. Such removal may be effected in any suitable manner as by a stripping element 37 which pushes the body endwise off the mandrel and onto a mandrel extension 38 (Figs. 1 and 2).

The stripping element 37 (Figs. 1, 2 and 7) is of yoke-like construction for partially embracing the mandrel and is carried as a bracket extension from a slide 42. This slide is reciprocated in a slideway 43 formed in the main frame and is retained therein by gibs 44. The lower surface of the slide 42 is slotted for the reception of a rack 45 which meshes with a spur gear 46 journaled on a pin 47 carried in a fork connection 48.

A longitudinal opening 49 is provided in the main frame through which the rack 45 and the gear 46 extend and are free to operate. The gear 46 also is formed as an integral part of a pinion 52 which in turn meshes with a rack 53 secured in a slot in pinion guide 54 mounted on the main frame of the machine.

The stripping element is operated for stripping in time with other moving parts of the machine through the fork connection 48 in any suitable manner, the stripping action taking place as the fork connection is moved to the right (as viewed in Fig. 2). This is while the mandrel is not rotating being then temporarily at rest. Element 37 thus in moving to the right, slides the completely wound container bodies onto and along the mandrel extension.

The mandrel extension 38 is a tube-like member having a hollow center as at 62 (Fig. 4). The outside dimension of this extension is slightly smaller than the mandrel 26 so that container bodies may be shifted laterally as they move along this extension. The mandrel extension is carried on the end of the mandrel and is secured thereto by a pin 63.

Figure 5:
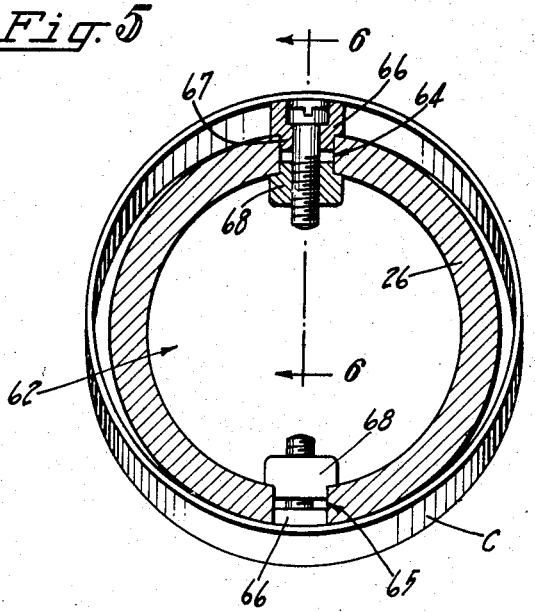
Fig. 5 is an enlarged transverse section of the mandrel extension and showing in detail a projection, as viewed substantially along the line 5—5 in Fig. 4.
Figure 6:
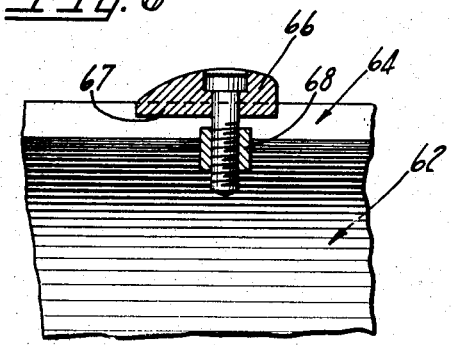
Fig. 6 is a fragmentary sectional view taken substantially along the line 6—6 in Fig. 5.

The mandrel extension wall is cut through in slots 64, 65 (Figs. 4, 5 and 6) which extend longitudinally and on opposite sides. These slots provide space for one or more adjustable projections 66 (Figs. 5 and 6). Each projection protrudes outwardly of the outer wall of the extension and each has a reduced section 67 where it extends in the slot 64 or the slot 65. The projection is secured in the mandrel extension by a machine screw or the like within the hollow center 62 and is threaded in a locknut 68 also seated in its slot 64 or 65.

The projections 66 are adjusted longitudinally of the slots to provide for various height containers passing along the extension. For obtaining the best results these projections are arranged in staggered relation on opposite sides of the extension and are spaced apart a distance equal to a can body length (Fig. 4).

Hence as a plurality of contiguous container bodies C are stripped from the mandrel by the reciprocating element 37 they are subjected to a lateral shifting action. This action moves the bodies first in one direction and then in an opposite direction so that as the ends of two adjacent bodies reach the protruding part of the projections, they are broken apart. In this manner contiguous container bodies are broken apart if they are stuck together by their abutting end edges overlapping or if they are stuck together by extruded adhesive resulting from the winding of the bodies.

In order to facilitate the separation of bodies and to prevent binding of bodies as they move off the mandrel and onto the mandrel extension, the forward end of the mandrel, identified by the numeral 26, is tapered as at 72 (Figs. 1 and 4). This cooperates with the first projection 66 to shift the body from its regular advancement. As the separated container bodies pass along the length of the mandrel extension they are discharged from the right-hand end of the same (Figs. 1, 2, 3 and 4) from which they may be transferred to any suitable place of deposit or further advanced to a subsequent machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for winding simultaneously a plurality of contiguous fiber container bodies, comprising in combination, a rotatable mandrel for receiving a plurality of flat body blanks having adhesive thereon and arranged end to end in contiguous relation for convolute winding into individual container bodies of multiple layers with the adhesive therebetween, a mandrel extension of reduced cross-section forming a continuation of said mandrel, means for stripping the wound bodies off said mandrel onto said mandrel extension and for advancing them along the extension, and a plurality of spaced apart projections located on opposite sides of said mandrel extension for shifting said bodies laterally of said mandrel extension as they move therealong for breaking the bodies apart when adjacent edges of contiguous bodies overlap or when surplus extruded adhesive sticks together the bodies.

2. In a machine for winding simultaneously a plurality of contiguous fiber container bodies, comprising in combination, feeding rollers for advancing a plurality of flat body blanks having adhesive thereon in end to end contiguous relation, a rotatable mandrel for receiving said blanks, gripping devices in said mandrel for holding the forward ends of the blanks in said mandrel for convolutely winding the blanks into contiguous container bodies of multiple layers with the adhesive therebetween, a mandrel extension of reduced cross-section and forming a continuation of said mandrel, means for stripping the wound bodies off said mandrel and for moving them onto and along said mandrel extension, and a plurality of adjustable projections located on opposite sides of said mandrel extension in staggered relation with adjacent projections spaced apart a distance equal to a container body length for shifting the said bodies laterally of said mandrel extension as they move therealong for breaking the bodies apart when adjacent edges of contiguous bodies overlap or when surplus extruded adhesive sticks together the ends of the bodies.

3. In a machine for winding simultaneously a plurality of contiguous fiber container bodies, comprising in combination, feeding devices for advancing a plurality of flat body blanks having adhesive thereon in end to end contiguous relation, a rotatable mandrel for receiving said blanks and for winding them into individual container bodies of a plurality of layers with the adhesive therebetween and with the bodies in end to end contiguous relation, a mandrel extension of reduced cross-section secured to said mandrel as a continuation of the same, means for stripping the wound bodies off said mandrel and for moving them onto and along said mandrel extension, and a plurality of projections secured on opposite sides of the mandrel extension and in spaced relation for shifting first one end and then the other of said bodies laterally of said mandrel extension as they move therealong for breaking the bodies apart when adjacent edges of contiguous bodies overlap and when extrusion of surplus adhesive sticks together the bodies.

HENRY EINLOTH.